United States Patent [19]

Erwin

[11] 3,783,963
[45] Jan. 8, 1974

[54] LINKAGE ANGLE STEERING CONTROL FOR POWERED IN-TANDEM VEHICLES

[75] Inventor: Louis R. Erwin, Livonia, Mich.

[73] Assignee: The Bendix Corporation, Southfield, Mich.

[22] Filed: Feb. 28, 1972

[21] Appl. No.: 229,900

[52] U.S. Cl............. 180/6.3, 180/6.48, 180/79.2 B
[51] Int. Cl............................................ B62d 11/04
[58] Field of Search............. 180/14 R, 14 A, 14 D, 180/6.3, 6.48, 51, 79.2 B

[56] References Cited
UNITED STATES PATENTS

| | | | |
|---|---|---|---|
| 3,151,694 | 10/1964 | Rogers | 180/51 |
| 1,026,662 | 5/1912 | Eisner | 180/6.3 |
| 3,245,488 | 4/1966 | Peterson | 180/14 R |

FOREIGN PATENTS OR APPLICATIONS

| | | | |
|---|---|---|---|
| 231,427 | 12/1960 | Australia | 180/6.3 |
| 1,252,362 | 12/1960 | France | 180/51 |
| 24,523 | 9/1909 | Great Britain | 180/6.3 |

Primary Examiner—David Schonberg
Assistant Examiner—Leslie J. Paperner
Attorney—John R. Benefiel

[57] ABSTRACT

A steering control arrangement for powered in-tandem vehicles, in which a powered vehicle trails a leading powered vehicle connected thereto by a linkage, the arrangement comprising an angle sensor at the connecting linkage sensing the angle between the vehicles created by steering of the lead vehicle or by deviations of the trailing vehicle due to roadway variations or other causes, and means for controlling the power to individual wheels of the trailed vehicle so as to create a steering-by-driving thereof in accordance with the sensed angle so that the trailed vehicle is steered so as to tend to eliminate the angle therebetween and follow the lead vehicle. In the embodiment disclosed, the angle existing at the linkage controls a valve which distributes flow from a pump to drive individual fluid motors on the trailed vehicle in accordance with the sensed angle to steer-by-drive the trailed vehicle to track the lead vehicle.

2 Claims, 4 Drawing Figures

PATENTED JAN 8 1974 3,783,963

LINKAGE ANGLE STEERING CONTROL FOR POWERED IN-TANDEM VEHICLES

BACKGROUND OF THE INVENTION

1. Field of the Invention

This invention concerns steering control systems for in-tandem powered vehicles.

2. Description of the Prior Art

Tandem or trailed operation of vehicles creates certain obvious problems in coordinating the speed and path of the individual vehicles to as to be consistent with one another to reduce strain on the running gear and to insure that each vehicle train follows the path of the lead vehicle so that the train as a whole stays on the roadway.

A more particular and aggravated problem is encountered in trains of individually powered vehicles used in rough or unimproved roadways such as are found in mining operations, and in which nonpositive drive means and steering-by-driving arrangements are commonly utilized. The increased resistance to travel of the individual wheels encountering obstacles causes a reduction in speed of that wheel to thus cause undesired skewing of the trailed vehicle. This causes vehicle train deviations from the roadway path and traction losses as individual vehicles and wheels are forced to roll faster than the drive means speed setting in an effort to keep up with the other vehicles, resulting in added drag.

Examples of arrangements to insure coordinated speed of the vehicles are disclosed in U.S. Pat. Nos. 3,227,235 and 3,578,096, which arrangements are generally satisfactory, and would preferably be used in conjunction with the system of the present invention to provide a vehicle train with coordinated speed and steering of the individual vehicles.

Prior art approaches to these steering problems have included the use of the type of linkage disclosed in U.S. Pat. Nos. 3,119,630 and 3,215,219 in which the interconnection between the vehicles incorporates an arrangement for steering the trailed vehicle by controlling the angle between the vehicles. This involves great force levels in the linkages and subjects the running gear to undesirable scrubbing and side forces.

A second approach has been to lock or interrelate a steering system in each vehicle so that steering of one vehicle produces an actuation of the steering mechanism of the trailed vehicle, as exemplified by U.S. Pat. Nos. 3,035,653; 3,245,488; and 3,183,990. These systems have involved a good deal of complex apparatus and connections between the vehicles, and does not solve the problem of unequal resistance between individual, nonpositively driven wheels described above.

U.S. Pat. No. 3,183,990 also discloses means for generating a refined correction signal to the steering mechanism dependent on conditions at the connection between the vehicle, but this particular system involves sensing of steering forces existing between the vehicles as a result of steering of the lead vehicle and failure to track of the trailed vehicle, and this requires the existence of thrust forces between the vehicles in order to produce an error and to generate the correction. Thus, skewing is allowed to exist if there is an absence of thrust forces which may allow skewing to exist without correction if the dynamics of the situation eliminates the thrusting forces while the vehicles are at an angle to each other.

Therefore, it is an object of the present invention to provide an arrangement for steering powered vehicles connected in-tandem so as to eliminate or reduce tracking forces between the vehicles without involving complex apparatus or interconnections between the vehicles, and which will compensate for unequal resistances encountered by the individual powered wheels and will always sense and correct skewing of the vehicles.

SUMMARY OF THE INVENTION

This and other objects which will become apparent upon a reading of the following specification and claims are accomplished by providing an arrangement comprising an angle sensor at the connecting linkage sensing the angle between the vehicles created by steering of the lead vehicle, and means for controlling the power to individual wheels of the trailed vehicle so as to create a steering-by-driving thereof in accordance with the sensed angle to tend to eliminate the same so that the trailed vehicle is steered to follow the lead vehicle and deviations of the trailed vehicle are corrected.

DETAILED DESCRIPTION

In the following detailed description certain specific terminology will be utilized for the sake of clarity and specific embodiments will be described in order to provide a complete understanding of the invention, but it is to be understood that the invention is not so limited and may be practiced in a variety of forms and embodiments.

Figure 1:
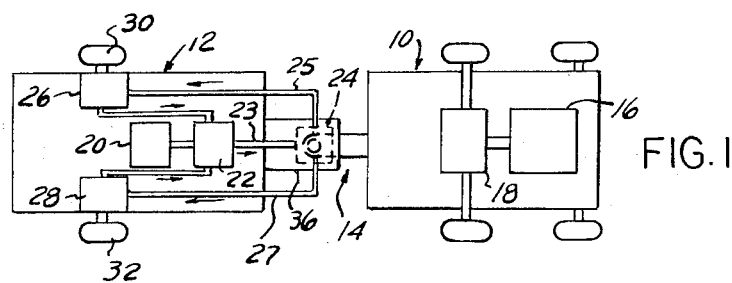
FIG. 1 is a plan view diagrammatic representation of a pair of powered vehicles connected in-tandem according to the present invention.

Referring to the drawings, and particularly FIG. 1, a pair of powered vehicles 10 and 12 are diagrammatically shown connected in-tandem by means of a connection 14.

The lead vehicle 10 includes some driving means such as a conventional engine 16 and transmission 18 or some other arrangement such as a hydrostatic drive.

The trailing vehicle 12 according to the preferred embodiment is powered by a prime mover 20 combined to drive a supply of fluid under pressure, preferably a pressure compensated variable displacement pump 22 which together comprise a means for generating motive energy. The output of pump 22 is directed via conduit 23 to an angle sensing valve 24 at the connection 14 between the vehicles 10 and 12 which transmits and distributes the flow via conduits 25 and 27 to a pair of individual fluid motors 26 and 28 adapted to drive respective traction means on each side of the vehicle shown as vehicle wheels 30 and 32. This flow distribution is such that a greater share of the supply flow is directed to one or the other of the fluid motors 30 or 32 during steering maneuvers to affect steering by differential driving such that the vehicle 12 will thereby track vehicle 10, and during a straight ahead travel, equal flow is directed to each fluid motor 26 and 28.

Figure 2:
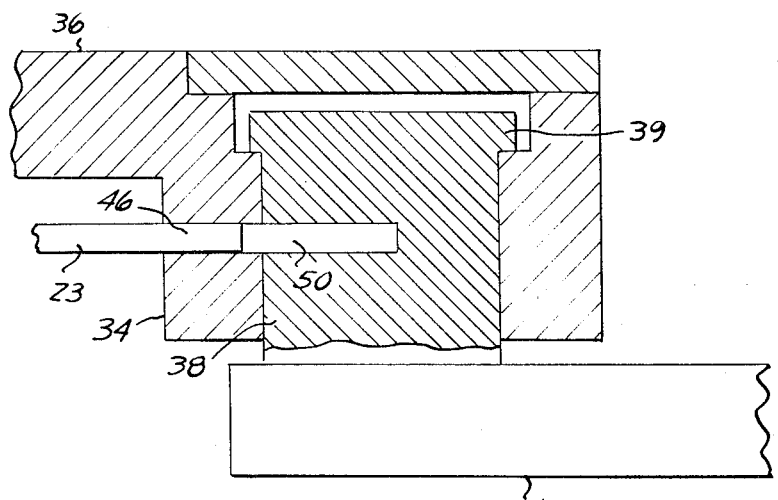
FIG. 2 is a view of a section taken through the vehicle connection by a vertical plane.
Figure 3:
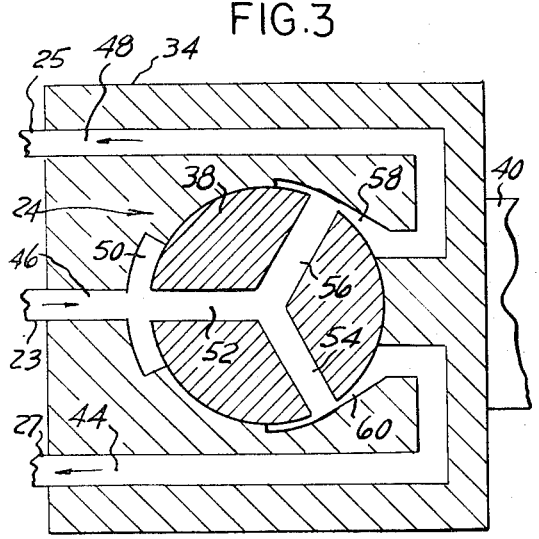
FIG. 3 is a view of a section taken through the vehicle connection by a horizontal plane.
Figure 4:
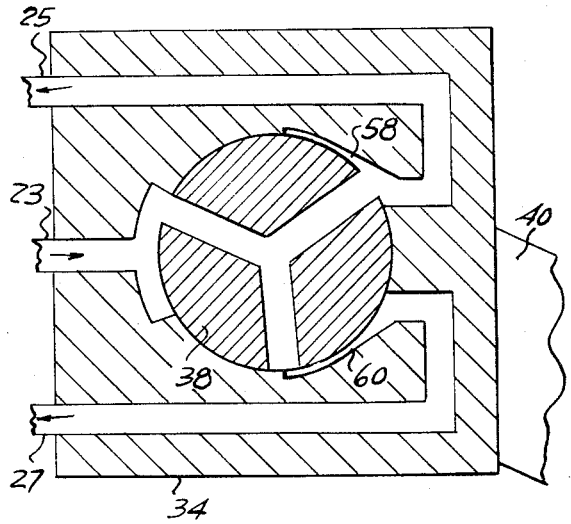
FIG. 4 is the view of the connection shown in FIG. 3, with the relationship of the elements during a turning maneuver illustrated.

Referring to FIGS. 2–4, the details of the angle sensing valve 24 and pivotal connection 14 is shown from which the method of obtaining this distribution can be understood.

Angle sensing valve 24 is formed by elements of the pivotal connection 14 and includes a valve body member 34 secured to link 36 connected to vehicle 12, and a metering element 38 secured to link 40 connected to vehicle 10 and disposed in a bore 42 in valve body 34.

In order to function as pivot connection as well as the valving function desired, metering element 38 is formed with a shoulder 39 retaining it in bore 40 to secure it therein.

Structural and other details, such as seals, fasteners, etc., are omitted from the drawings for the sake of clarity.

Conduits 23, 25, and 27 are connected to passages 44, 46, and 48 formed in valve body 34 so that passage 46 is connected to the high pressure supply from the pump 22, and passages 44 and 48 are connected to fluid motors 28 and 26, respectively.

Passage 46 opens into an arcuate supply groove 50 formed in valve body 34. A supply passage 52 is formed in metering element 38 and adapted to register with arcuate supply groove 50 through the maximum angle allowed to develop between the vehicles so that supply passage 52 is always supplied with high pressure fluid from pump 22.

Supply passage 52 splits into branch passages 54 and 56 each terminating at the diametrically opposite surface of the metering element 38 from the arcuate supply groove 50. Opposite each branch passage 54 and 56 is a pair of metering ports 58 and 60, respectively, which comprise sloping grooves formed in the valve body 34 which merge into passages 44 and 48. This slope is such that as metering element 38 rotates in the valve body 34 in one direction the gap therebetween increases with respect to one metering port and decreases with respect to the other and vice versa in the opposite direction, so that the relative share of supply flow to each fluid motor 26 and 28 is controlled as a function of the relative angular position of the valve body 34 and metering element 38 in order that the differential flow to the fluid motors 28 and 26 increases with increasing angles to thus apply steering corrections at a greater rate for greater deviations.

It is noted that in a specific design of the angle-sensing device, the vehicle wheel diameters, wheel spacing relative to travel axis, and relative position of wheels to the drawbar, etc., must be considered in setting the proportion change per degree according to known principles of automatic control system design and vehicle dynamics. For example, an inappropriately high change with angle would cause excessive side-to-side motion at the pivotal connection 14 as first one wheel and then the other of the trailed vehicle 12 would be driven at as much as twice the gross speed. An inappropriately low gain would be nearly equivalent to no correction system.

In the straight-ahead position as shown in FIG. 3, the metering port gaps are equal and thus flow is equally divided between passages 44 and 48 so that fluid motors 26 and 28 rotate at equal speeds so that trailed vehicle 12 is caused to track vehicle 10 in its straight-ahead direction.

In the event skewing of the vehicles is created by unequal resistance to movement encountered by the individual wheels, this causes relative angular movement between metering element 38 and valve body 34 to create a differential flow to the individual fluid motors 26 and 28 in a sense to tend to eliminate such skew and of a magnitude corresponding to the extent of angular deviation from the straight-ahead position to thus correct this skewing.

In the event the leading vehicle 10 is steered, this causes relative angular movement between the vehicles and hence between metering element 38 and valve body 34, and this causes greater flow to the outboard fluid motor by the operation of the angle sensing valve to increase its speed and the inside fluid motor to decrease its speed to thus tend to eliminate the angular position to cause the trailed vehicle 12 to be steered in the same direction as the leading vehicle 10 and as soon as the leading vehicle steering is discontinued to eliminate any skew angle.

It can be seen that the characteristics of the various elements such as metering ports 58 and 60 can be arranged so that the rate of this steering corresponds to that of the leading vehicle 10 to thus cause tracking of the leading vehicle 10 by the trailing vehicle 12 without significant steering forces being transmitted therebetween.

In the full turn position shown in FIG. 4, which is defined by positive stops (not shown), maximum flow is to the outboard fluid motor, while minimum flow is to the inboard fluid motor. A certain minimum flow to each fluid motor is required to insure oil in the motor at all times, so that complete shutoff of supply flow is avoided.

From this description, it can be appreciated that an extremely simple arrangement has been provided for, which minimizes steering forces created by tracking of the vehicles. Furthermore, the steering mechanism of the trailing vehicle is self-contained and does not rely on signals transmitted from the leading vehicle steering mechanism so that connections between the vehicles are eliminated save for the simple mechanical connection 14, greatly reducing the cost, complexity of the system and increasing its reliability.

Furthermore, the skewing created by the unequal resistance met by the individual powered wheels as described in detail may be substantially eliminated.

Many variations are of course possible within the scope of the invention, as for example the angle sensing may control differential throttling or other speed control of paired conventional drive motors by primary controls or control the differential displacement of hydrostatic drive motors by a servo system rather than direct control over flow to fluid motors as disclosed. Likewise, an electrically sensed angle could control differential flow via an electrically operated valve at a convenient hydraulic circuit location.

What is claimed is:

1. An arrangement for steering a trailed vehicle connected in tandem to a leading vehicle comprising:
   means for supplying a fluid flow under pressure;
   a housing element, attached to one of said vehicles, having an input passage for receiving said fluid flow and at least two output passages;
   a metering element attached to the other of said vehicles, rotatably disposed in said housing element, said metering element having internal passages for distributing said fluid flow between said output passages as a function of the angular displacement of said metering element to said housing element; and steering means responsive to the fluid flow along said at least two paths for controlling the direction of motion of said trailed vehicle to cause said trailed vehicle to track said leading vehicle.

2. The arrangement of claim 1 wherein said steering means includes at least two fluid drive motors, one of said motors disposed on each side of said trailed vehicle, said motors adapted to generate motive energy in response to the distributed fluid flow output from said pivotable means.

* * * * *